G. SHERWIN & E. HOOPLE.
LAMP.
No. 173,073.　　　　　　　　　　Patented Feb. 1, 1876.
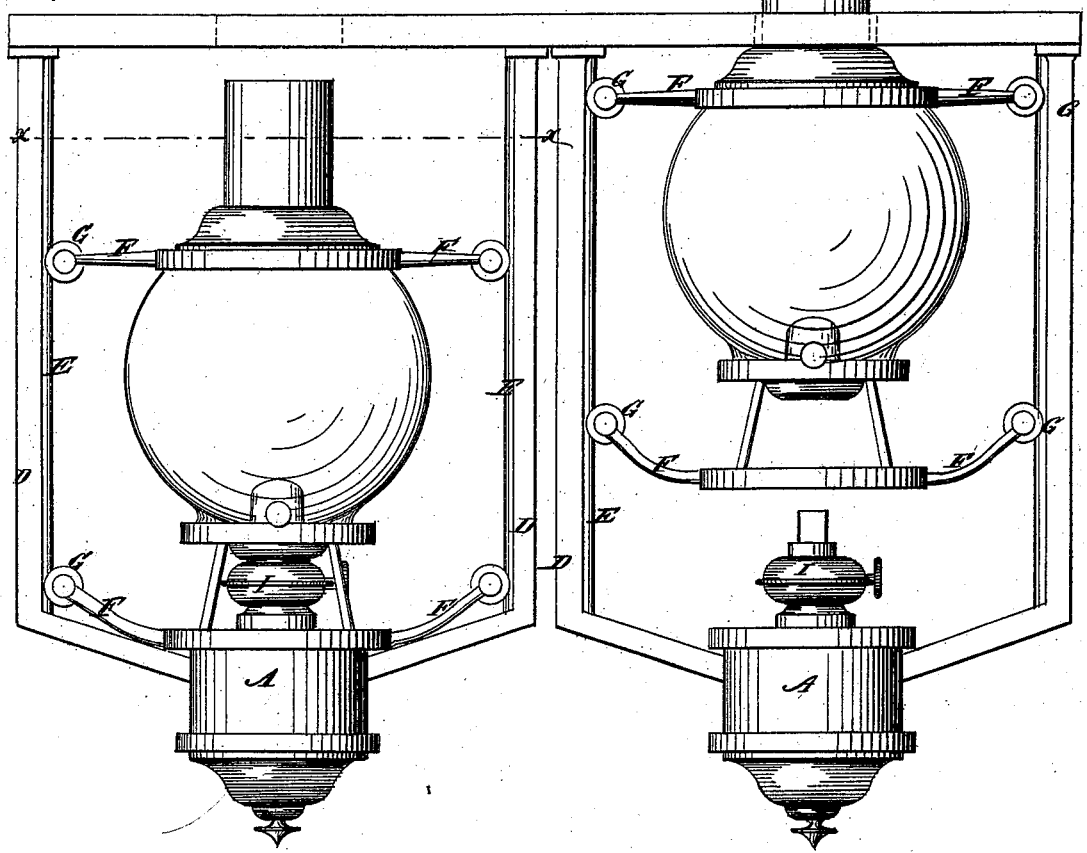

UNITED STATES PATENT OFFICE.

GEORGE SHERWIN AND EDMOND HOOPLE, OF NEW YORK, N. Y.

IMPROVEMENT IN LAMPS.

Specification forming part of Letters Patent No. 173,073, dated February 1, 1876; application filed January 3, 1876.

*To all whom it may concern:*

Be it known that we, GEORGE SHERWIN and EDMOND HOOPLE, of the city, county, and State of New York, have invented a new and useful Improvement in Lamps, of which the following is a specification:

Our invention relates to center and bracket lamps; and it consists of the globe or chimney fitted on guides or ways, with or without friction-rollers, to enable the globe or chimney to be raised up and let down for lighting, trimming, filling, &c., easier, more accurately, and with less care than it can be without the guides, the said guides being to control and keep the globe in place, so that it will not fall when raised up, and will drop into its place with certainty when down.

Figure 1 is a side elevation of a center-lamp arranged according to our invention. Fig. 2 is a side elevation, showing the globe raised up on the guides; and Fig. 3 is a horizontal section taken on line $x\ x$, Fig. 1.

Similar letters of reference indicate corresponding parts.

A is the cup of the center-frame D, in which the lamp is to be suspended; E, vertical guides in the center; F, arms connected to the globe and fitted to the guides, so as to keep the globe from falling out, while, at the same time, allowing it to be raised up, as in Fig. 2, and lowered down to its seat again.

In this example the arms are represented with friction-rollers G to run on the guides, which is best; but they are not essential.

The center-lamp suspender has ordinarily two rods, well adapted for thus guiding and controlling the lamp; but in a bracket-suspender it will be necessary to provide one or both of the rods.

The length of the guides will be sufficient to allow the lamp I to be taken out of the cup A readily for filling.

Having thus described our invention, we claim as new and desire to secure by Letters Patent—

The combination, with globe, of supports at top and bottom, having arms F, with rolls at end, the ways E, and the top extension working in hole of cross-bar, as shown and described, to prevent the globe from toppling when held aloft.

GEORGE SHERWIN.
EDMOND HOOPLE.

Witnesses:
T. B. MOSHER,
ALEX. F. ROBERTS.